United States Patent
Paul

(10) Patent No.: US 10,834,043 B1
(45) Date of Patent: Nov. 10, 2020

(54) DIGITAL MESSAGING DATA EXTRACTION FOR DIGITAL GROUP COMPOSITIONS

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 50 days.

(21) Appl. No.: 16/242,526

(22) Filed: Jan. 8, 2019

(51) Int. Cl.
*H04L 12/58* (2006.01)
*G06F 16/9536* (2019.01)
*H04L 29/08* (2006.01)
*G06Q 50/00* (2012.01)

(52) U.S. Cl.
CPC .......... *H04L 51/32* (2013.01); *G06F 16/9536* (2019.01); *G06Q 50/01* (2013.01); *H04L 51/10* (2013.01); *H04L 51/12* (2013.01); *H04L 67/22* (2013.01); *H04L 67/306* (2013.01)

(58) Field of Classification Search
CPC . H04L 43/067; H04L 43/045; H04L 43/0888; H04L 41/5019; H04L 67/02
USPC ......................................................... 709/224
See application file for complete search history.

(56) References Cited

U.S. PATENT DOCUMENTS

| | | | |
|---|---|---|---|
| 2005/0037809 A1* | 2/2005 | Guan | H04L 12/1813 455/556.2 |
| 2014/0047335 A1* | 2/2014 | Lewis | H04N 21/2187 715/716 |
| 2015/0347561 A1* | 12/2015 | Voss | G06F 16/955 707/738 |

OTHER PUBLICATIONS

Rick Broida, How to name a group conversation in Messages for iOS, Dec. 18, 2015, CNET, https://www.cnet.com/how-to/how-to-name-a-group-conversation-in-messages-for-ios/ (Year: 2015).*

* cited by examiner

*Primary Examiner* — Zi Ye
(74) *Attorney, Agent, or Firm* — FisherBroyles, LLP

(57) ABSTRACT

Systems and methods for extracting data from digital messages for digital group compositions may include (1) determining that a user of a computing device is electronically participating in a group chat with one or more additional users, (2) providing the user with a digital prompt suggesting that the user add the additional users as contributors to a group social media composition, (3) receiving, via the computing device, user input accepting the suggestion, and (4) adding the additional users as contributors to the group social media composition. Various other methods, systems, and computer-readable media are also disclosed.

20 Claims, 8 Drawing Sheets

DIGITAL MESSAGING DATA EXTRACTION FOR DIGITAL GROUP COMPOSITIONS

BACKGROUND

Current social networking applications allow users all over the world to share their thoughts and ideas on various topics. Some social networking platforms allow users to share content using a variety of different digital channels. For example, a social networking application may include both a status-broadcasting channel and a private-messaging channel. The status-broadcasting channel may allow users to post social media compositions (e.g., a digital story composition and/or a newsfeed composition) via user profiles. The private-messaging channel may allow users to send and receive private digital messages to others via private chat rooms.

At times, users may wish to share similar and/or related content using multiple different channels. For example, users planning a group trip may be corresponding in a group chat (via a private-messaging channel) prior to the trip in preparation for the trip. Then, during and/or after the trip, the users may wish to post social media compositions relating to the trip (via a status-broadcasting channel). Thus, the instant disclosure identifies a need for improved systems and methods for facilitating the creation of related social media content in multiple different sharing channels.

SUMMARY

As will be described in greater detail below, the instant disclosure describes various systems and methods for extracting digital messaging data for digital group compositions. In one example, a computer-implemented method may include (1) determining that a user of a computing device is electronically participating in a group chat with one or more additional users (e.g., via a group messaging application running on the computing device), (2) providing the user with a digital prompt suggesting that the user add the additional users as contributors to a group social media composition (such as a digital shared story and/or a group photo album), (3) receiving, via the computing device, user input accepting the suggestion, and (4) adding the additional users as contributors to the group social media composition (e.g., as part of creating the group social media composition).

In one embodiment, the digital prompt may further include a prompt to create the group social media composition. In this embodiment, the digital prompt may be provided within a messaging interface displaying the group chat. In another embodiment, providing the user with the digital prompt may include providing the digital prompt as part of a group-composition creation process initiated by the user. In one such embodiment, the digital prompt may be provided within a contributors-selection interface presented as part of the group-composition creation process.

In some examples, the computer-implemented method may further include identifying content from one or more digital messages transmitted in the group chat. In these examples, the computer-implemented method may further include suggesting a theme for the group social media composition based on the identified content and/or suggesting the identified content as content for the group social media composition. Additionally or alternatively, the computer-implemented method may include identifying a name of the group chat and suggesting a theme for the group social media composition based on the name of the group chat.

In one embodiment, a system for implementing the above-described method may include a determination module, stored in memory, that determines that a user of a computing device is electronically participating in a group chat with one or more additional users. The system may also include a suggestion module that (1) provides the user with a digital prompt suggesting that the user add the additional users as contributors to a group social media composition and (2) receives, via the computing device, user input accepting the suggestion. The system may also include a composition-creation module, stored in memory, that adds the additional users as contributors to the group social media composition. Finally, a physical processor configured to execute the determination module, the suggestion module, and the composition-creation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that a user of a computing device is electronically participating in a group chat with one or more additional users, (2) provide the user with a digital prompt suggesting that the user add the additional users as contributors to a group social media composition, (3) receive, via the computing device, user input accepting the suggestion, and (4) add the additional users as contributors to the group social media composition.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
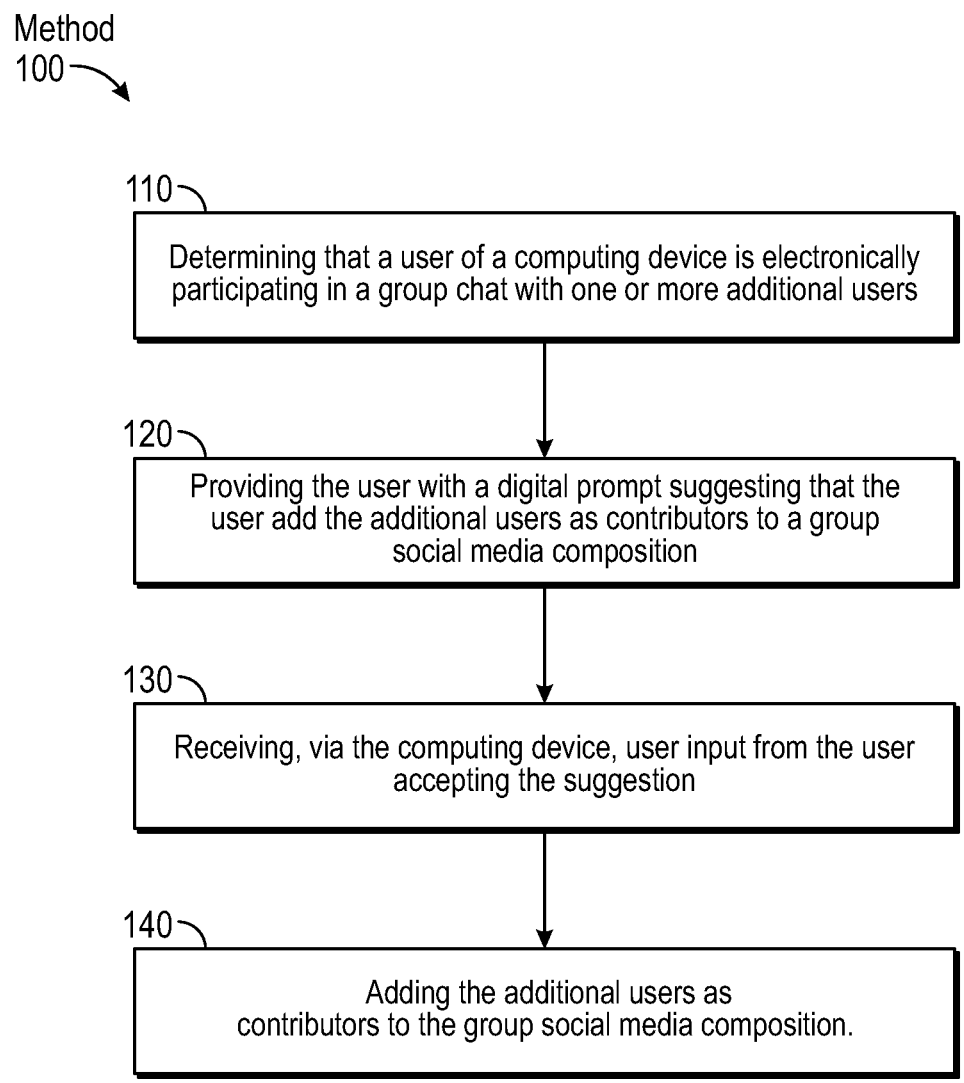
FIG. 1 is a flow diagram of an exemplary method for extracting digital messaging data for digital group compositions.

Throughout the drawings, identical reference characters and descriptions indicate similar, but not necessarily identical, elements. While tshe exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to creating a group composition (such as a shared story and/or a shared photo album) based on group membership data extracted from a group chat. For example, a social networking platform with both a messenger product and a stories product may identify a group chat within the messenger product. Then, a shared story may be created that automatically includes the members of the group chat as contributors to the shared story. In some examples, a prompt may appear in the messenger product offering to create a shared story with the members of the group chat as contributors to the shared story. In other examples, the members of the group chat may appear as suggested contributors to a shared story in response to one of the members of the group chat initiating a process for creating the shared story. In one embodiment, suggested content (e.g., a suggested post, photograph, and/or name for the group composition) may be derived from content extracted from the group chat (e.g., from one or more messages transmitted within the group chat and/or a name of the group chat).

As will be explained in greater detail below, embodiments of the instant disclosure may provide an easier means of creating group compositions based on data available from a group chat. This may improve the functioning of a computer itself by improving the computer's ability to meaningfully organize data and use the meaningfully organized data to generate new content. This may also improve the functioning of a computer itself by reducing the number of user inputs that must be received by the computer from a user attempting to access and/or create group-relevant data.

The following will provide, with reference to FIG. 1, detailed descriptions of computer-implemented methods for creating group compositions based on data extracted from a messenger application. Detailed descriptions of corresponding example systems will also be provided in connection with FIG. 2. In addition, detailed descriptions of corresponding user interfaces used within a group-composition creation flow will be provided in connection with FIGS. 3-8.

FIG. 1 is a flow diagram of an exemplary computer-implemented method 100 for creating group compositions based on data extracted from a digital group chat. The steps shown in FIG. 1 may be performed by any suitable computer-executable code and/or computing system, such as the systems described herein. In one embodiment, the steps shown in FIG. 1 may be performed by modules operating within a mobile device. For example, the steps shown in FIG. 1 may be performed by modules operating in a backend server (and/or a group of multiple servers that operate in conjunction with one another) maintained by and/or in behalf of a social networking platform. Additionally or alternatively, the steps shown in FIG. 1 may be performed by modules operating in a computing device 202 (e.g., belonging to a user 204) as shown in exemplary system 200 in FIG. 2.

Computing device 202 generally represents any type or form of computing device capable of reading computer-executable instructions. For example, computing device 202 may represent a user device such as a smart phone and/or a tablet. Additional examples of computing device 202 may include, without limitation, laptops, desktops with mobile elements, wearable devices, personal digital assistants (PDAs), etc. In some examples, a user of computing device 202 (e.g., user 204) may have a user account with a social-networking platform and may have an instance of a social networking application (i.e., social networking application 206), which is managed by the social-networking platform and associated with the user's account, installed on computing device 202. In these examples, the steps shown in FIG. 1 may be performed at least in part by modules operating in connection with the social networking application 206.

Social networking application 206 generally represents any type or form of computer program managed by a social networking platform that is installed and executed on a user device to cause the user device to perform useful tasks related to social networking. In some examples, social networking application 206 may include different portions dedicated to different tasks. For example, the social networking application may include (1) a private-messaging portion and (2) a status-broadcasting portion. In one embodiment, the private-messaging portion and the status-broadcasting portion may operate as different portions of the same application. In another embodiment, the private-messaging portion may be configured as a separate application that works in conjunction with social networking application 206.

Figure 2:
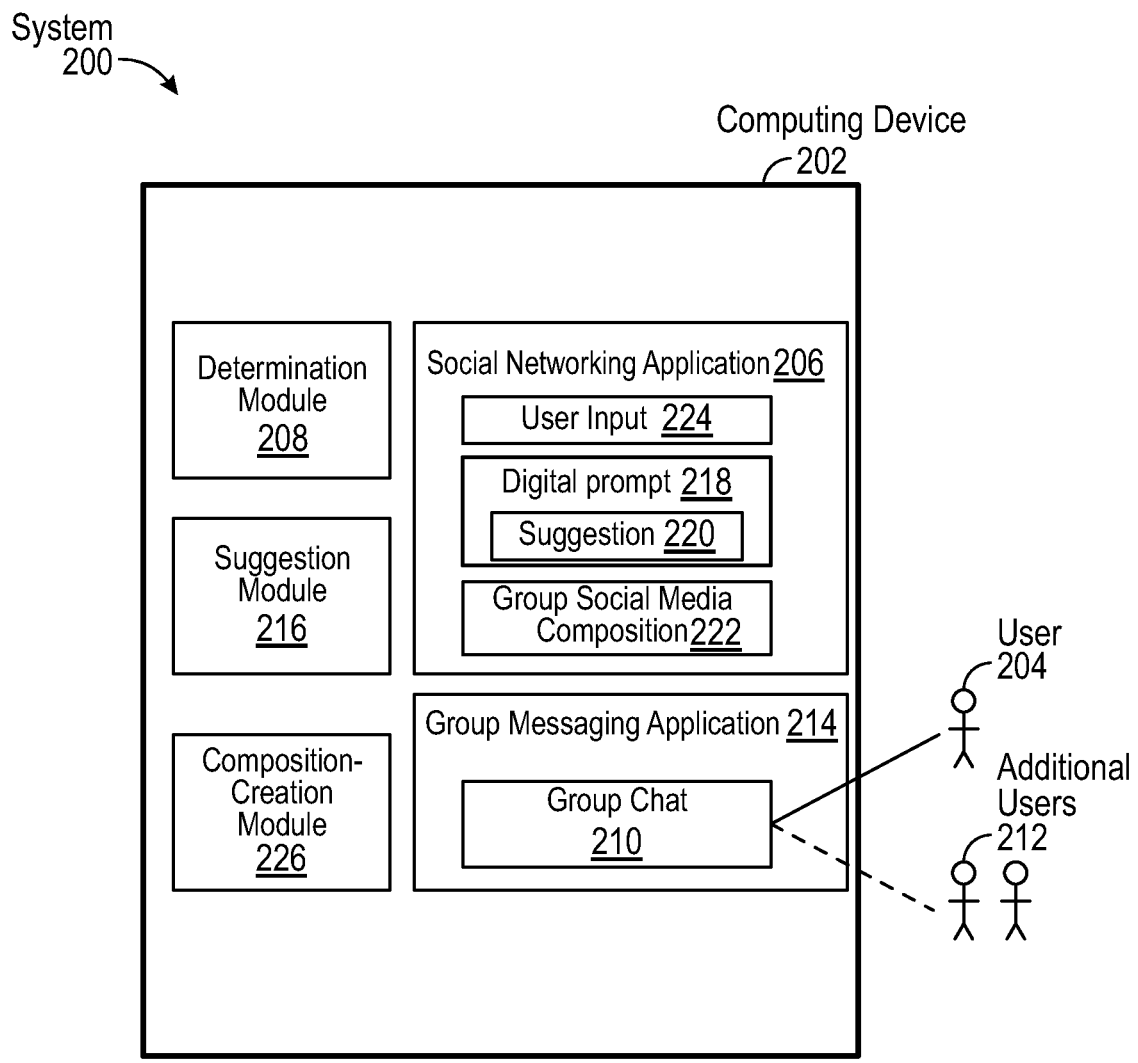
FIG. 2 is a block diagram of an exemplary system for extracting digital messaging data for digital group compositions.

The private-messaging portion of social networking application 206 may allow users to send digital messages to other users via digital group chats (such as group chat 210 depicted in FIG. 2). FACEBOOK MESSENGER is a specific example of a private-messaging portion of a social networking application. The term "group chat" refers generally to a digital container for digital messages exchanged between a group of users. A group chat may be private. That is, access to a given group chat may be restricted to users who have been invited to join the group chat. The digital messages exchanged within the group chat may be text-based or may include additional media content (e.g., images, videos, links, graphics, digital stickers, etc.).

Figure 3:
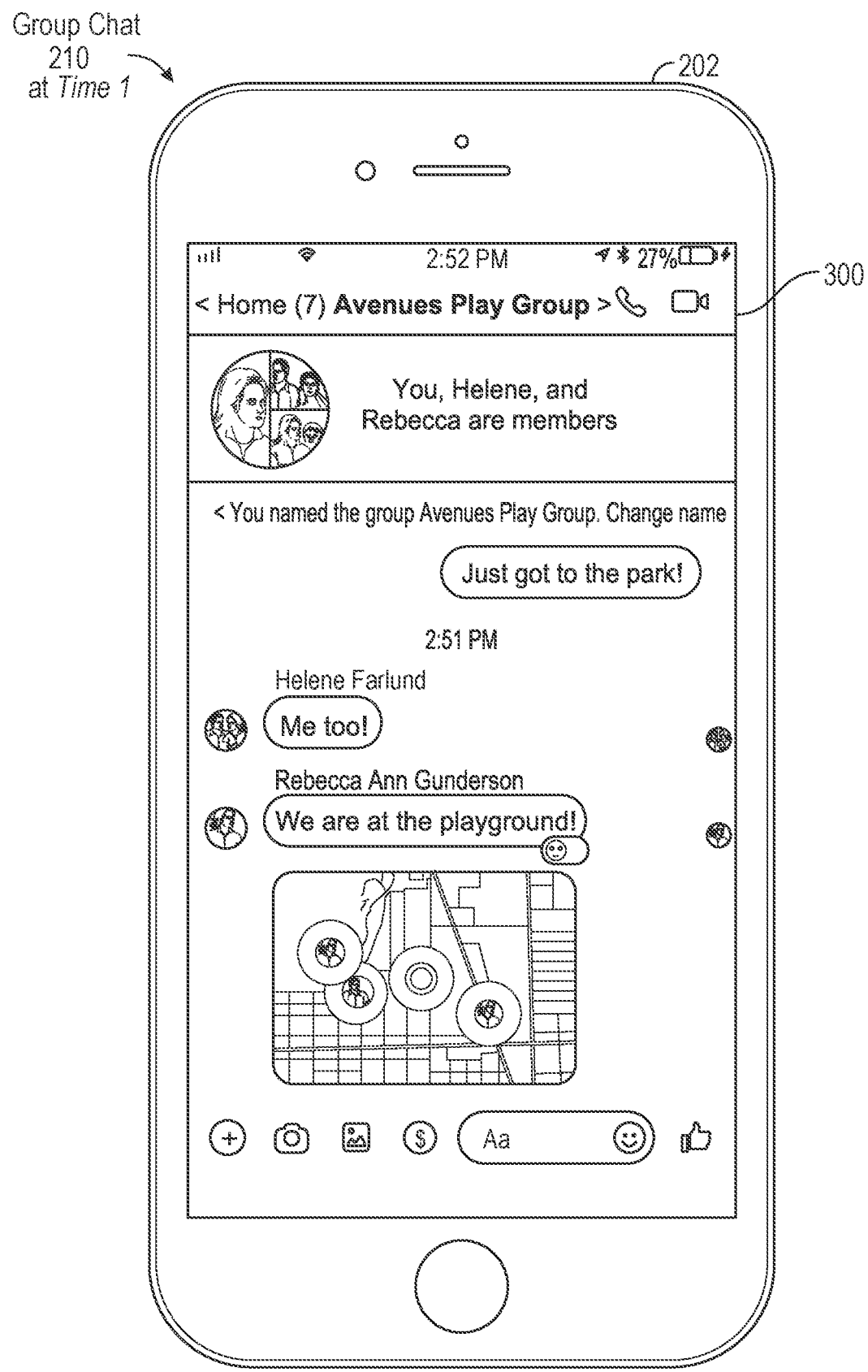
FIG. 3 is an illustration of an exemplary group chat at a specific time.

FIG. 3 is an illustration depicting an exemplary embodiment of a group chat (i.e., an exemplary depiction of group chat 210). As shown in FIG. 3, group chat 210 may include three participants (Helene, Rebecca, and user 204) and the name "Avenues Play Group" (submitted via user input). As shown in FIG. 3, the participants of "Avenues Play Group" may, at a first moment in time (Time 1), be exchanging messages relating to a meet-up at the park.

The status-broadcasting portion of the social networking application may provide users with digital profiles that may be used to broadcast status updates to other users. The status updates may take the form of digital social media compositions. The status-broadcasting portion may include at least two functionalities: (1) a composition functionality and (2) a consumption functionality. The composition functionality may enable a user to create social media compositions (e.g., digital story compositions and/or digital newsfeed compositions). The consumption functionality may enable a user to view user compositions created by other users (e.g., via a stories consumption channel and/or a newsfeed consumption channel) presented via one or more graphical user interfaces of the social networking application.

As used herein, the term "stories consumption channel" generally refers to any type or form of social media consumption channel that presents a continuous series of story compositions to a composition-consumer, one by one. In one example, the stories consumption channel may transition from presenting one story composition to the next automatically, without requiring any user input to do so. In some examples, a story composition may only be viewable for a predetermined amount of time. For example, a story composition may be set to disappear after twenty-four hours. In addition to presenting story compositions created by a solo-author, the stories consumption channel may be configured to present shared stories created by a group of authors, as will be discussed in greater detail below.

Figure 4:
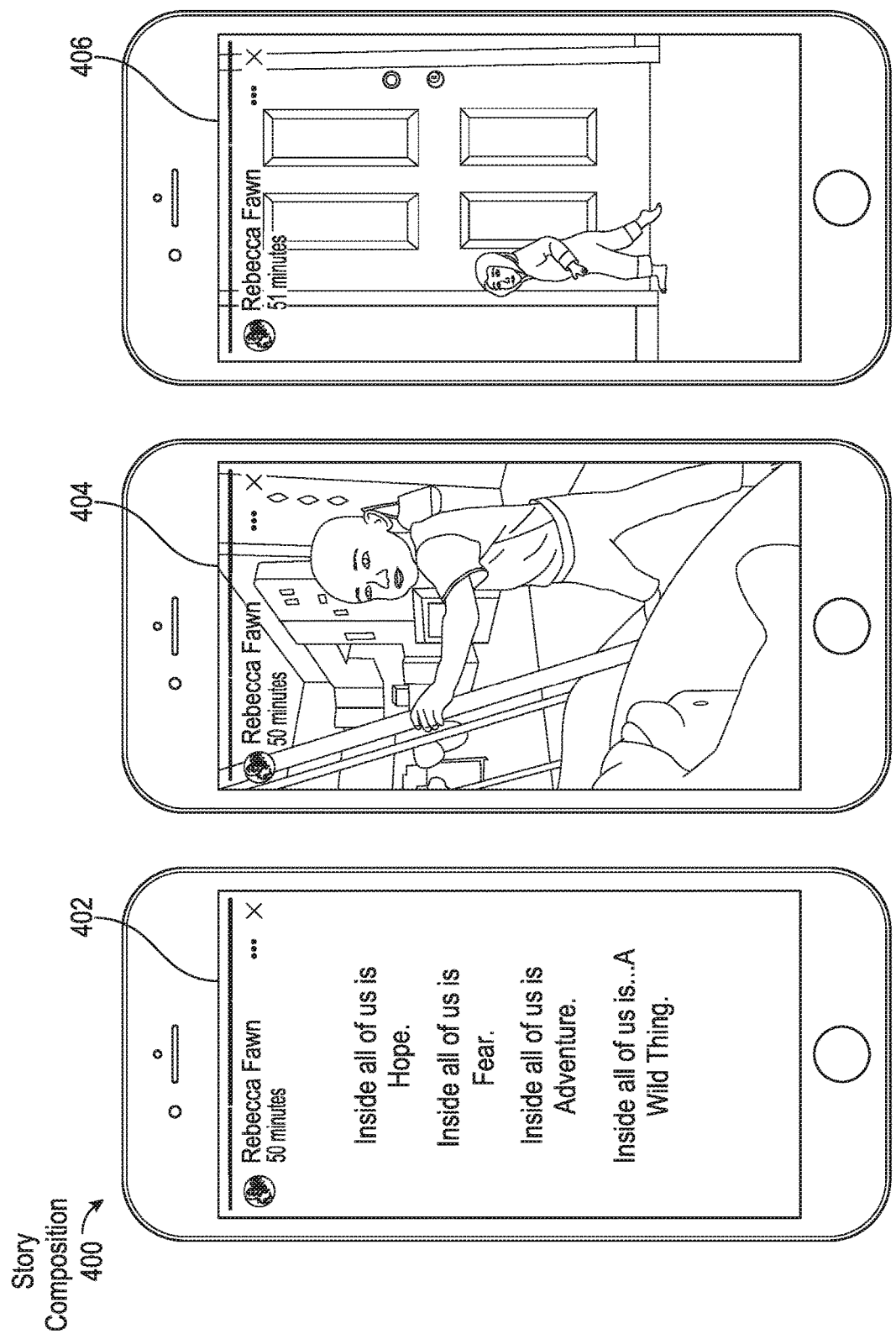
FIG. 4 is an illustration of an exemplary digital story composition created by a sole contributor.

The term "story composition" as used herein generally refers to any type or form of social media composition intended for a stories consumption channel. The story composition may include a variety of content (e.g., a digital photograph, a digital video, a gif, text, a link, etc.). In some examples, a story composition may include multiple posts, each of which includes different content. In one such example, the story composition may include a text-based cover card that is displayed for a predetermined amount of time followed by each post, one by one, each of which may be displayed for a subsequent predetermined amount of time. Using FIG. 4 as a specific example, a story composition 400 may include: (1) a first story composition 402 (in this example, a cover card with text), (2) a second story composition 404 (in this example, a boy holding the pole of a tent), and (3) a third story composition 406 (in this example, a boy standing in front of a door). As shown in FIG. 4, each of the stories may indicate the user's name, associating the story with its solo-author.

The term "shared story" as used herein generally refers to a collection of individual stories created by multiple different contributors that are stored in the same stories container and posted as a group (e.g., one after the other in a series) in a stories consumption channel. In some examples, a shared story may be organized around an event (e.g., a family vacation, a field trip, a campaign rally, etc.). In additional or alternative examples, a shared story may be organized around a theme (e.g., karaoke compositions of songs). In some examples, the rights to contribute to a shared story may be limited to a group of users invited to contribute to the shared story (e.g., by a producer of the shared story). Additionally, the rights to view a shared story may be limited based on a privacy setting selected by the producer and/or a contributor to the shared story. For example, the shared story may only be displayed in the stories consumption channels of the contributors. Alternatively, the shared story may only be displayed in the stories consumption channels of the contributors and in the stories consumption channels of the contributors' friends. A specific example of a shared story (illustrated in FIG. 8) will be described in connection with step 140.

Figure 5:
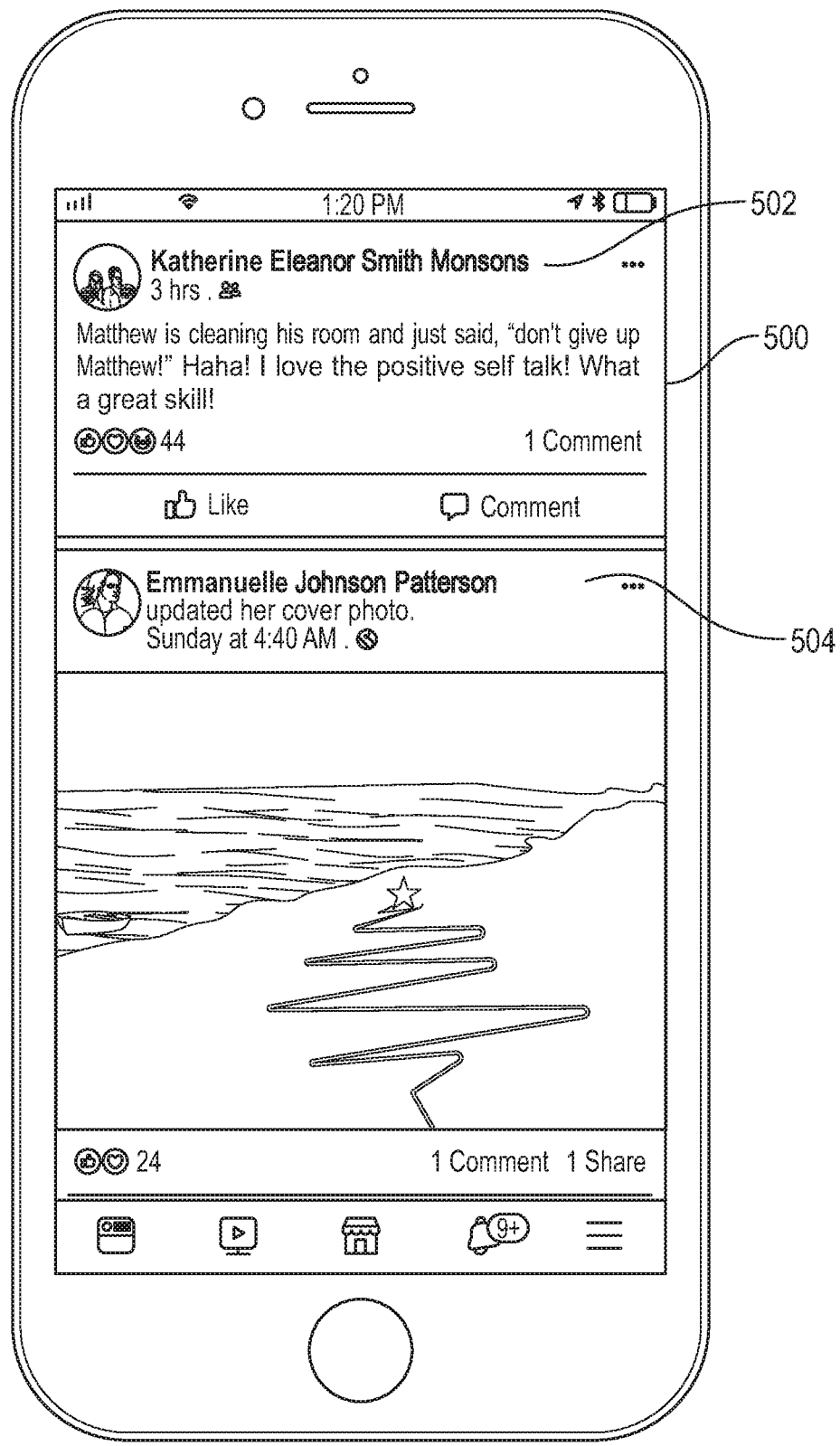
FIG. 5 is an illustration of an exemplary digital newsfeed.

As used herein, the term "newsfeed consumption channel" generally refers to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). FIG. 5 provides a specific example of a newsfeed 500 with a text-based newsfeed composition 502 and an image-based newsfeed composition 504.

The term "newsfeed composition" as used herein generally refers to any type or form of composition that may be displayed in a newsfeed consumption channel. Newsfeed compositions may include, without limitation, text-based compositions, such as text-based newsfeed composition 502 in FIG. 5, media-based compositions (which may include either a single media item or a collage of multiple media items), such as image-based newsfeed composition 504 in FIG. 5, and/or a link to an online article. A newsfeed composition may include a variety of types of media, including (without limitation) an image, a video, a graphic, descriptive metadata (such as a digital sticker of a time, temperature, emotion), etc.

Returning to FIG. 1, at step 110, one or more of the systems described herein may determine that a user of a computing device is participating in a group chat with one or more additional users. For example, as illustrated in FIG. 2, a determination module 208 may determine that user 204 is participating in a group chat 210 with one or more additional users 212.

Determination module 208 may determine that user 204 is participating in group chat 210 in a variety of contexts. For example, a group messaging application 214 may be installed on computing device 202 that enables users to create and communicate through group chats. In this example, group chat 210 may be provided to user 204 via group messaging application 214. In some embodiments, group messaging application 214 may operate as part of and/or in connection with social networking application 206 (e.g., as part of a private-messaging portion of social networking application 206). In additional or alternative embodiments, group messaging application 214 may operate as part of and/or in connection with a text-messaging application operating as part of or in connection with a telecommunications platform.

In examples in which user 204 is participating in group chat 210 via group messaging application 214, determination module 208 may determine that user 204 is participating in group chat 210 based on group-chat membership data (e.g., maintained by the social networking platform and/or the telecommunications provider), indicating that user 204 is a member of group chat 210. Additionally or alternatively, determination module 208 may detect that user 204 is viewing and/or submitting one or more messages via an interface associated with group chat 210, such as interface 300 in FIG. 3.

In some examples, determination module 208 may identify additional information, beyond user 204's participation in group chat 210. For example, determination module 208 may identify the name of group chat 210 (e.g., "Avenues Play Group" in FIG. 3), membership data indicating the other users participating in group chat 210 (Helene and Rebecca in FIG. 3) and/or a change in the membership of group chat 210.

Figure 6:
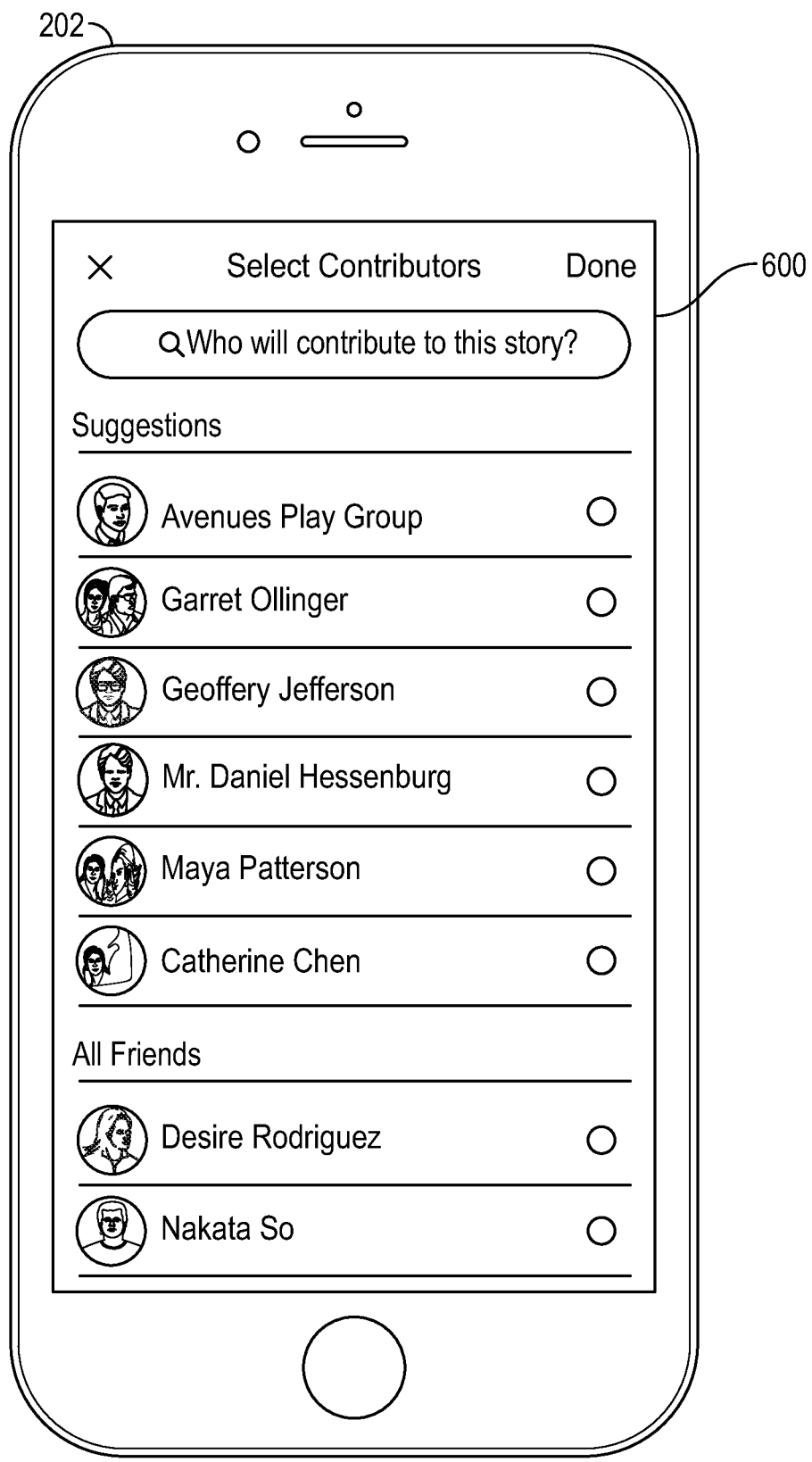
FIG. 6 is an illustration of an exemplary contributor selection screen (e.g., displayed as part of a shared story creation process).

In some embodiments, determination module 208 may identify content within one or more digital messages exchanged via group chat 210. In one example, determination module 208 may additionally determine a theme based at least in part on the identified content. As a specific example, the embodiment of group chat 210 depicted in FIG. 3 (i.e., the "Avenues Play Group" chat) may subsequently exchange messages related to the holiday Halloween (i.e., at Time 2), as shown in FIG. 6. In this specific example, determination module 208 may additionally determine the theme "Halloween" (e.g., based on an analysis of the text exchanged at Time 2, the date, one or more images sent, etc.).

Returning to FIG. 1, at step 120, one or more of the systems described herein may provide the user with a digital prompt suggesting that the user add the additional users as contributors to a group social media composition. For example, a suggestion module 216 may provide user 204 with a digital prompt 218 that includes a suggestion 220 to add additional users 212 as contributors to a group social media composition 222.

Group social media composition 222 may refer generally to any type or form of social media composition with multiple contributors that may be shared and viewed via social networking application 206 (e.g., via a status-broadcasting portion of social networking application 206). In some examples, group social media composition 222 may refer to a digital shared story. In other examples, group social media composition 222 may refer to a digital group photo album and/or group newsfeed composition.

Suggestion module 216 may provide user 204 with digital prompt 218 in a variety of contexts. In one example, suggestion module 216 may provide user 204 with digital prompt 218 as part of a suggestion to create group social media composition 222. In this example, digital prompt 218 may further include a prompt to create group social media composition 222. In this example, user 204 may initiate a group-composition creation process to create a group composition (i.e., that includes additional users 212 as contributors) by selecting a selectable element with digital prompt 218.

In another example, suggestion module 216 may provide user 204 with digital prompt 218 as part of a group-composition creation process previously initiated by the user. In this example, suggestion module 216 may provide user 204 with digital prompt 218 after the user has initiated the group-composition creation process.

Suggestion module 216 may display digital prompt 218 in a variety of different interfaces. In one embodiment, suggestion module 216 may display digital prompt 218 within a messaging interface displaying content from group chat 210 (e.g., an interface displayed via a private-messaging portion of social networking application 206). As a specific example, suggestion module 216 may display, within a group chat interface such as interface 300 in FIG. 3, a prompt to create a group composition with the members of the group chat (e.g., with language such as "Create a Shared Story with Helene and Rebecca?").

Additionally or alternatively, suggestion module 216 may display digital prompt 218 within a contributors-selection interface presented as part of a composition creation process (e.g., in an interface displayed via a status-broadcasting portion of social networking application 206). In one such example, user 204 may be presented with a series of composition interfaces as part of a composition creation flow and the contributors-selection interface may be presented within this composition creation flow. FIG. 6 depicts an exemplary contributor-selection interface 600 with a list of suggested contributors to add to a digital story being created by user 204 (e.g., to transform a solo-author story into a shared story). Included in the list of suggested contributors is an entry for "Avenues Play Group" (corresponding to the group chat depicted in FIG. 3).

In some examples, digital prompt 218 may suggest that user 204 add additional users 212 to group social media composition 222 by listing out each of their names individually. In other examples, digital prompt 218 may suggest that user 204 add additional users 212 to group social media composition 222 by listing the name of group chat 210 (as depicted in FIG. 6).

In certain embodiments, suggestion module 216 may provide one or more additional suggestions relating to group social media composition 222 (i.e., beyond the suggestion to add additional users 212 as contributors). In one such embodiment, suggestion module 216 may recommend a theme (e.g., a title, visual background, and/or musical background) for group social media composition 222. The suggested theme may be based on the name of group chat 210 (e.g., identified by determination module 208). Using FIG. 3 as a specific example, suggestion module 216 may provide a digital prompt that suggests that user 204 name group social media composition 222 "Avenues Play Group" (e.g., based on determination module 208 having determined that "Avenues Play Group" is the name of group chat 210).

As another example, suggestion module 216 may suggest a theme for group social media composition 222 based on content (e.g., identified by determination module 208) from one or more digital messages transmitted in group chat 210. Using FIG. 7 as a specific example, "Avenues Play Group" (depicted in FIG. 3) may, at a subsequent time depicted in FIG. 7 (Time 2), exchange messages relating to Halloween. In this specific example, the disclosed systems and methods (e.g., determination module 208) may have inferred that the messages at Time 2 relate to Halloween. In response to this inference, suggestion module 216 may suggest "Halloween" as a theme for group social media composition 222. For example, suggestion module 216 may (at Time 2) create and transmit a digital prompt to a display element of computing device 202 with the suggestion "Create a Group Halloween Story with Avenues Play Group?"

In one embodiment, suggestion module 216 may transmit a series of prompts via computing device 202. Using FIG. 7 as a specific example, at Time 2 a first digital prompt may include a suggestion to create a shared story with the members of "Avenues Play Group," a second digital prompt may include a suggestion to name the shared story "Avenues Halloween," and a third digital prompt may include a suggestion to create posts for the shared story based on the messages exchanged in group chat 210 at Time 2 (e.g., the messages displayed in FIG. 7).

In one embodiment, group social media composition 222 may have already been created and may already be active at the time step 110 is performed and, at step 110, determination module 208 may have determined that a new user was added to group chat 210. In this example, suggestion module 216 may suggest, in digital prompt 218, that user 204 add the new user as a contributor to the already-active group social media composition 222.

Returning to FIG. 1, at step 130, one or more of the systems described herein may receive, via the computing device, user input accepting the suggestion. For example, as illustrated in FIG. 2, suggestion module 216 may receive user input 224, via computing device 202, accepting suggestion 220, displayed within digital prompt 218, to add additional users 212 as contributors to group social media composition 222.

In examples in which digital prompt 218 is displayed within an interface of social networking application 206 (e.g., as part of a social media composition creation process), suggestion module 216 may receive user input 224 via an interface displayed by social networking application 206 (as illustrated in FIG. 2). Additionally or alternatively, in examples in which digital prompt 218 is displayed within interface of group messaging application 214, suggestion module 216 may receive user input 224 via an interface displayed by group messaging application 214.

Suggestion module 216 may receive user input 224 via computing device 202 in a variety of ways. For example, suggestion module 216 may receive user input 224 via an auxiliary device, such as a keyboard and/or a digital mouse coupled to computing device 202. As another example, suggestion module 216 may receive user input 224 via a touchscreen of computing device 202.

Finally, at step 140, one or more of the systems described herein may add the additional users as contributors to the group social media composition. For example, as illustrated in FIG. 2, a composition-creation module 226 may add additional users 212 to group social media composition 222. In response to adding additional users 212 to group social media composition 222, additional users 212 may be given access rights to contribute to group social media composition 222. In one example, each additional user may receive a digital alert indicating that he or she has been added as a contributor and/or prompting the additional user to add content to group social media composition 222.

Figure 7:
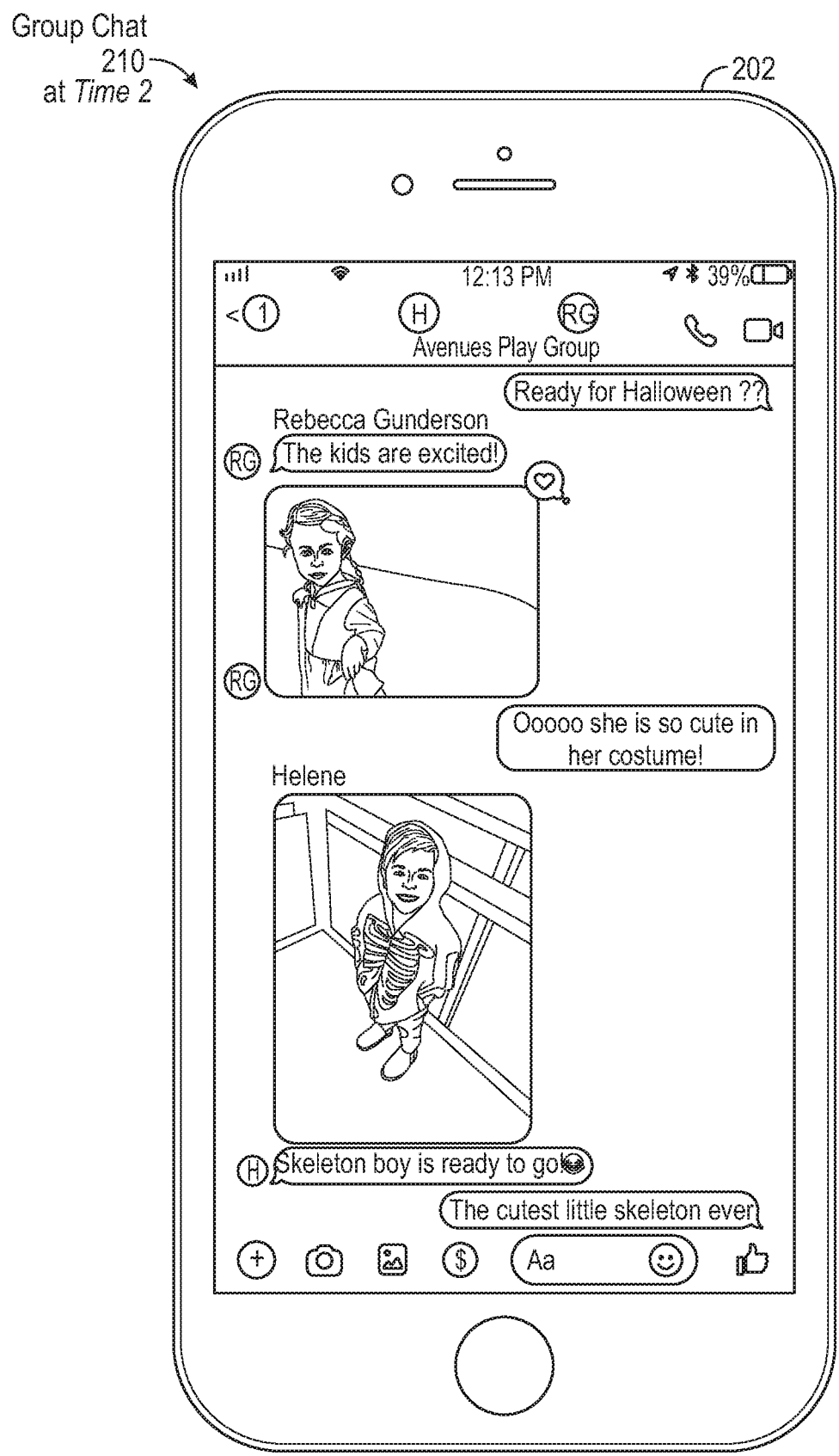
FIG. 7 is an additional illustration of the exemplary group chat illustrated in FIG. 3 at a subsequent time.
Figure 8:
FIG. 8 is an illustration of an exemplary shared story, created by contributors extracted from the group chat illustrated in FIGS. 3 and 7, with content relating to the content transmitted at the subsequent time illustrated in FIG. 7.

In some examples, composition-creation module 226 may additionally create group social media composition 222 (e.g., in response to suggestion module 216 receiving user input 224). Building off the specific example illustrated in FIG. 7, composition-creation module 226 may create a shared story composition 800 (illustrated in FIG. 8) with three posts (shown in interfaces 802, 804, and 806). As shown in FIG. 8, shared story composition 800 may be named "Avenues Halloween" and content from the messages exchanged in group chat 210 at Time 2 (as shown in FIG. 7) may be used to automatically create posts that are based on the content (e.g., in response to user input accepting the suggestions to do so).

As described throughout the instant disclosure, the disclosed systems and methods may provide systems and methods for generating group social media compositions based on membership data and/or messaging content extracted from a group chat (e.g., provided by a group messaging application). In one example, a participant in a group chat may receive a digital prompt, via a display element of the computing device, inviting the participant to (1) create a group social media composition (via a social media application) with the participants of the group chat as contributors or (2) add the participants of the group chat as contributors to an existing group social media composition. In some examples, the disclosed systems and methods may suggest a theme and/or content for a group social media composition based on content extracted from a group chat (e.g., based on a name of the group chat, content from messages exchanged via the group chat, a time period corresponding to the group chat, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user input and transform the user input into a digital social media composition. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining that a user of a computing device is electronically participating in a group chat with one or more additional users via a messaging interface provided by a private-messaging platform;
   providing, within the messaging interface, a digital prompt suggesting that the user create, via a status-broadcasting platform, a group social media composition that includes each of the additional users from the group chat as contributors;
   receiving, via the computing device, user input accepting the suggestion; and
   creating, via the status-broadcasting platform, the group social media composition with the additional users as contributors.

2. The computer-implemented method of claim 1, wherein the user is participating in the group chat via a group messaging application running on the computing device.

3. The computer-implemented method of claim 1, wherein the group social media composition comprises at least one of:
   a digital shared story; or
   a digital group photo album.

4. The computer-implemented method of claim 1, wherein the status-broadcasting platform comprises a story platform.

5. The computer-implemented method of claim 1, wherein the status-broadcasting platform comprises a newsfeed platform.

6. The computer-implemented method of claim 1, wherein the private-messaging and status-broadcasting platforms represent different platforms within a same social networking application.

7. The computer-implemented method of claim 1, wherein the private-messaging platform is provided by a first application and the status-broadcasting platform is provided by a separate application that works in conjunction with the first application.

8. The computer-implemented method of claim 1, further comprising:
   identifying a name of the group chat; and
   suggesting a theme for the group social media composition based on the name of the group chat.

9. The computer-implemented method of claim 1, further comprising identifying content from one or more digital messages transmitted in the group chat.

10. The computer-implemented method of claim 9, further comprising at least one of:
    suggesting a theme for the group social media composition based on the identified content; or
    suggesting the identified content as content for the group social media composition.

11. The computer-implemented method of claim 10, wherein the suggested content comprises at least one of:
    a suggested post that includes the identified content; or
    a suggested photograph that includes the identified content.

12. A system comprising:
    a determination module, stored in memory, that determines that a user of a computing device is electronically participating in a group chat with one or more additional users via a messaging interface provided by a private-messaging platform;
    a suggestion module, stored in memory, that:
       provides, within the messaging interface, a digital prompt suggesting that the user create, via a status-broadcasting platform platform, a group social media composition that includes each of the additional users from the group chat as contributors; and
       receives, via the computing device, user input accepting the suggestion;
    a composition-creation module, stored in memory, that creates, via the status-broadcasting platform platform, the group social media composition with the additional users as contributors; and
    at least one physical processor configured to execute the determination module, the suggestion module, and the composition-creation module.

13. The system of claim 12, wherein the user is participating in the group chat via a group messaging application running on the computing device.

14. The system of claim 12, wherein the group social media composition comprises at least one of:
    a digital shared story; or
    a digital group photo album.

15. The system of claim 12, wherein the status-broadcasting platform comprises a story platform.

16. The system of claim 12, wherein the status-broadcasting platform comprises a newsfeed platform.

17. The system of claim 12, wherein the private-messaging and status-broadcasting platforms represent different platforms within a same social networking application.

18. The system of claim 12, wherein the private-messaging platform is provided by a first application and the status-broadcasting platform is provided by a separate application that works in conjunction with the first application.

19. The system of claim 12, wherein:
    the determination module further identifies a name of the group chat; and
    the suggestion module further suggests a theme for the group social media composition based on the name of the group chat.

20. A non-transitory computer-readable medium comprising one or more computer-readable instructions that, when executed by at least one processor of a computing device, cause the computing device to:
    determine that a user of a computing device is electronically participating in a group chat with one or more additional users via a messaging interface provided by a private-messaging platform;
    provide, within the messaging interface, a digital prompt suggesting that the user create, via a status-broadcasting platform, a group social media composition that includes each of the additional users from the group chat as contributors;
    receive, via the computing device, user input accepting the suggestion; and create, via the status-broadcasting platform, the group social media composition with the additional users as contributors.

\* \* \* \* \*

UNITED STATES PATENT AND TRADEMARK OFFICE
CERTIFICATE OF CORRECTION

PATENT NO. : 10,834,043 B1  
APPLICATION NO. : 16/242526  
DATED : November 10, 2020  
INVENTOR(S) : Debashish Paul Page 1 of 1

It is certified that error appears in the above-identified patent and that said Letters Patent is hereby corrected as shown below:

In the Claims

Claim 12, at Column 12, Line 15 should read:  
status-broadcasting platform, a group social media Claim 12, at Column 12, Line 21 should read:  
creates, via the status-broadcasting platform, Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*